United States Patent Office 3,330,778
Patented July 11, 1967

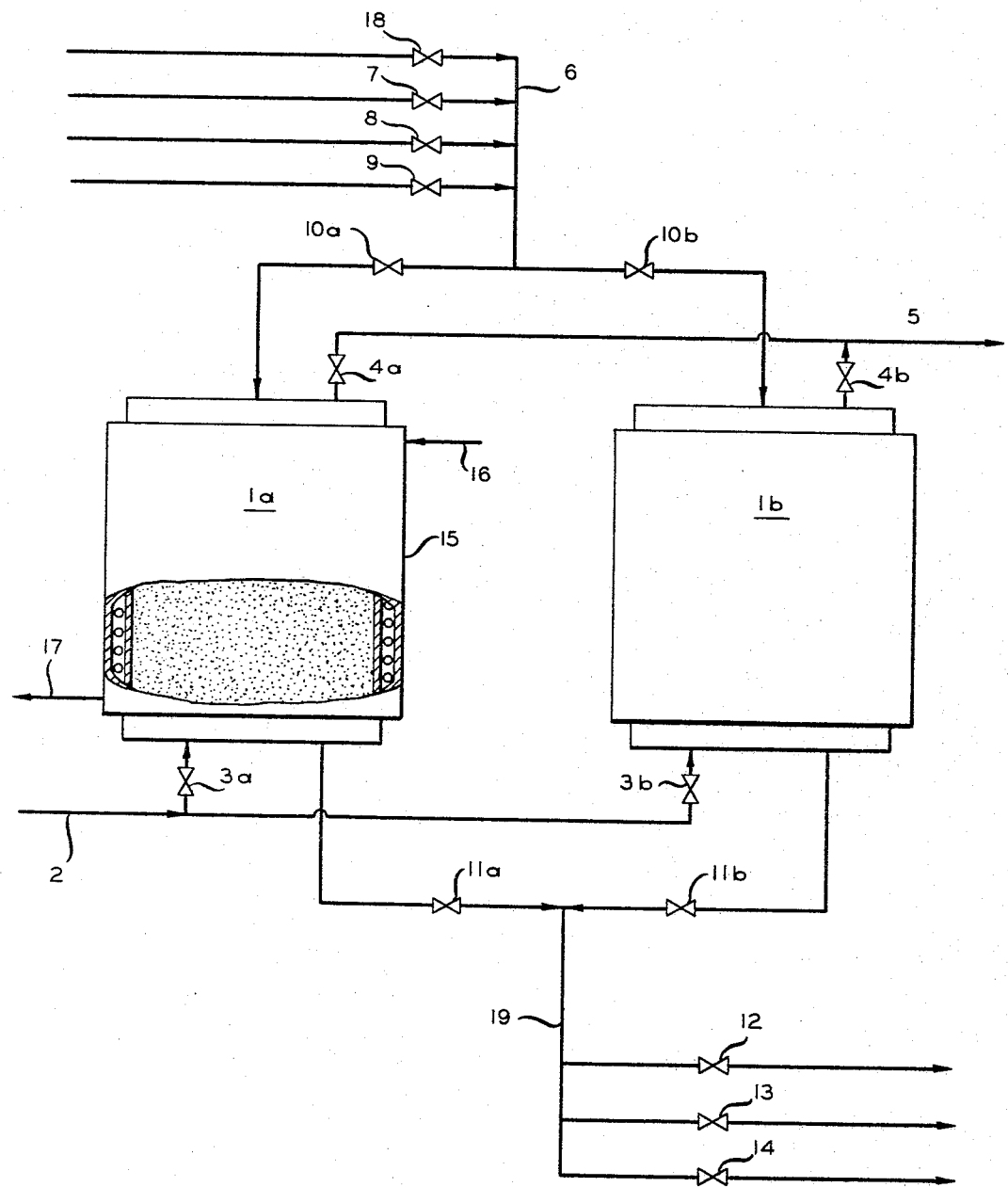

3,330,778
REGENERATION OF ADSORBENT BEDS WITH
WATER-SOLVENT-GAS CYCLE
Howard B. Irvin, Bartlesville, Okla., assignor to Phillips
Petroleum Company, a corporation of Delaware
Filed Sept. 14, 1964, Ser. No. 396,118
4 Claims. (Cl. 252—414)

This invention relates to adsorbent beds and especially to the regeneration of zeolite adsorbents. An aspect of this invention relates to a method of regenerating molecular sieves which have been used in the purification of solvent, such as toluene, which is to be recycled through a polymerization process.

In the polymerization of 1,3-butadiene it is economically desirable that the solvent used in the process be recycled. During this reuse, certain impurities tend to collect in the system which are detrimental to the action of the polymerization catalysts. Since this decrease in catalyst efficiency requires introduction of additional catalyst to the system, which adds considerably to the cost of the polymerized product, it is very desirable that a means of preventing the build-up of these catalyst poisons be found. Recent experimentation has shown that a zeolitic material commonly called molecular sieve of the 13X type is very efficient in restoring the solvent to a suitable standard for use in the polymerization reactor without build-up of the catalyst poisons. (The 13X designation identifies the zeolite as having a micro-structure whose pore openings are about 13 A. in diameter. The size of these pore openings determines the selectivity characteristics of the sieve during the adsorption process. See U.S. Patent No. 2,882,244.) However, as alcoholic, phenolic and other presently unidentified impurities from the solvent build up in the molecular sieve, the bed loses its purifying power and eventually the level of impurities remaining in the solvent recycled to the polymerization process reaches an unacceptable level. Economics again preclude discarding the bed after one such saturation, and operating efficiency can be gained in treating the solvent only if the molecular sieve bed can be regenerated after use.

It has been common practice in attempting to attain satisfactory regeneration of the molecular sieve bed to wash the bed with a polar compound such as water which is more strongly adsorbed by the bed than the adsorbate of the purification step. As the polar compound (water) is adsorbed by the bed the poisons which had been held there are desorbed and removed from the system. In order to restore the bed's adsorptivity, it is necessary that the polar compound added during the regeneration procedure be removed. This has been commonly done by the use of a hot purge gas which heats the bed to such an extent that the polar compound is driven off and the bed is thus "dried." This regeneration procedure has not been satisfactory as noted by a previously unexplainable loss in adsorptive capacity which results in a practically inactive bed after a relatively few repetitions of the regeneration cycle.

An object of this invention is to provide a method of regenerating zeolitic adsorbent beds which results in a more fully rejuvenated adsorptive capacity.

Another object of this invention is to provide a method of regenerating molecular sieves which is less detrimental to the overall lifespan of the bed and thus capable of an increased number of cyclic repetitions.

A further object of this invention is to provide a means for regeneration of molecular sieve beds which have been used to treat recycle toluene to be used as a butadiene polymerization solvent.

Still another object of this invention is to provide a process for regenerating zeolitic molecular sieves which permits less carbonaceous build-up in the bed, thus requiring less frequent high temperature "burn-off" treatment.

Further objects of this invention will become apparent to those skilled in the art from reading the following specification.

During the treatment of recycle toluene from a butadiene polymerization process, catalysts poisons are adsorbed by the molecular sieve bed and thus removed from the solvent. In addition to these catalyst poisons, certain other impurities are removed from the solvent stream. Polymerizible unsaturated compounds and heavies such low molecular weight polymers of butadiene are collected and retained by the bed. In order to maintain long bed life by preventing these materials from forming insoluble, non-volatile deposits, it is necessary that they be removed before the bed is heated during the hot purge gas step of the conventional regeneration procedure. The introduction of water into the bed as the initial step of regeneration accomplishes primarily the desorption of the adsorbate and is not capable of flushing the water-insoluble polymers and unsaturates from the beds. Since these water-insoluble materials are also relatively non-volatile in most instances, most are not removed by the hot purge either. Temperatures in the bed during the purge gas step are normally 400–650° F. which results in baked deposits and polymerization of the adsorbed unsaturated compounds. This latter polymerization may rupture the zeolitic micro-structure, thus detracting from or destroying its adsorptive power. I have, therefore, found it necessary to modify and improve conventional regeneration procedure by insertion of a means for flushing materials other than the adsorbate from the bed.

Broadly speaking, my invention is a method for regenerating zeolite adsorbents which comprises introducing sufficient water into the zeolite micro-structure to desorb previous adsorbate, flushing the adsorbent with solvent capable of dissolving materials retained by said adsorbent outside the zeolite microstructure, and then drying the adsorbent with a flow of hot inert gas.

According to one method of practicing this invention, the molecular sieve bed is removed from the solvent stream, e.g., toluene when associated with the polymerization of butadiene. Continuous purification of the solvent stream may be achieved by using multiple beds whereby one or more molecular sieve beds is being regenerated while at the same time another one or more beds is being used to treat solvent. As soon as the one or more beds being used for adsorption has become contaminated by adsorbate and other materials so that a sufficiently pure percolate is no longer being attained, this bed or beds may be regenerated according to the invention while the bed or beds previously regenerated is substituted in the treating process. An embodiment of the invention is briefly described as follows:

The first step in this regeneration procedure is to drain the recycle solvent from the off-stream bed. The bed is now treated with water under carefully controlled conditions. Since water is very strongly adsorbed on the sieves, it displaces practically all alcohols and other catalyst poisons adsorbed on the bed. The heat of adsorption of water on the molecular sieves is very high (1800 B.t.u. per pound of water vapor). Therefore, means must be provided to remove this heat to such an extent that the bed temperature will be held below 150° F., thus preventing polymerization of unsaturated hydrocarbons such as butadiene to insoluble and non-volatile polymers. This heat transfer problem may be solved by using a large flow of inert gas to carry the water as vapor into the beds. The inert gas may be any, such as natural gas or nitrogen, which are available in large quantities. Heat of adsorption is transferred to this carrier gas and removed from the bed. In case a sufficient supply of inert gas is not available the heat of adsorption of liquid water introduced slowly into the bed may be removed by means of a cooling jacket or similar indirect heat transfer means through which a coolant is circulated. In the design of such a cooling system, it must be kept in mind that the capacity of the system must be such that the temperature of the bed will not exceed 150° F. so that deposits remaining in the bed will not be carbonized or polymerized. Following treatment of the bed with water, the molecular sieve is flushed with a fresh solvent such as toluene at 180–220° F. so that essentially all "bed poisons" such as alcohols and phenols which were not removed by the water treatment are carried out of the bed. It is now safe to treat the bed with a hot purge gas or vapor at approximately 500° F. to remove the adsorbed water and "dry" the bed. The bed is then cooled by means of a flow of inert gas such as nitrogen or methane to the temperature at which it is used to purify the recycle solvent. The regeneration procedure described above can be completed in approximately 24 hours after which the bed may be returned to its on-stream status.

Various means of modifying this regeneration procedure can be utilized such as pulling a vacuum on the bed during the purge gas treatment step. Any such obvious modification in the various aspects of this invention should not be interpreted to detract from its novelty and scope.

The figure is the flow diagram of a system for treating solvent from a butadiene polymerization process with molecular sieve adsorbent beds. The diagram is simplified to portray only the elements essential to the practice of this invention. Aspects pertaining more to the use of the invention rather than its practice, such as the subsequent utilization of natural gas employed as a water carrier gas or purge gas as a fuel gas to optimize the economics of the process, are not illustrated in the diagram. Impure, recycle solvent from the butadiene polymerization process is introduced by means of line 2 through valve 3b, while valve 3a remains closed, into adsorbent bed 1b and thence after treatment is returned through valve 4b to storage facilities for reuse as a polymerization solvent. Thus while the solvent stream is being channeled through bed 1b, identical bed 1a is being regenerated by means of the following process. After draining recycle solvent from the bed, liquid water is introduced through valve 9 into line 6 through which it is channeled to bed 1a by closing valve 10b and opening valve 10a. Introduction of this water into the bed should be controlled carefully so that the temperature of the bed does not vary radically. A means of controlling the bed temperature is provided by cooling jacket 15 through which a coolant is circulated by introduction at 16 and extraction at 17. By sprinkling or spraying the water evenly over the bed and coordinating this introduction of water with the capacity of the cooling jacket, the temperature may be held below 150° F. throughout the bed. The desorbate and any other material removed by the bed during the solvent purification which can be carried away by the water percolate is removed from the bed by opening valves 11a and 14, and closing valve 11b. When the water treatment of the bed is complete valves 9 and 14 are closed and valves 8 and 12 are opened. A fresh solvent such as toluene at 180–220° F. is introduced through valve 8 and flushed through bed 1a to remove essentially all polymerizable compounds, polymers and other nonvolatile materials. The flushed material and solvent are then removed from the system through valve 12. When the flushing is complete, valves 8 and 12 are closed and a purge gas such as nitrogen or natural gas at approximately 500° F. is used to heat the bed 1a to drive off the remaining solvent and water. The bed is thus purged of foreign contaminants. A cooling gas such as nitrogen or natural gas may be introduced through valve 18 after the purging to return the bed to its on-stream temperature. After bed 1a has been rejuvenated by means of this procedure it may be placed back on-stream by opening valves 3a and 4a while closing valves 3b and 4b, which thereby prepares bed 1b for its regeneration step.

*Example I*

In order to check the effects of treating recycle solvent with 13× molecular sieves after regeneration of the bed according to this invention, five treatment-regeneration cycles were run. The bed used consisted of 143.7 grams of 13× molecular sieve pellets. During the purification step dry recycle toluene was introduced and treated at the rate of 50 ml./minute. The adsorption process was operated in the liquid phase at room temperature (75–80° F). The adsorbent bed was regenerated by passing an inert gas stream containing water vapor through the bed to load the bed with water equalling 15–20 percent of the weight of the sieves. Temperature did not exceed 150° F. during this phase of the regeneration. Next a hot (200° F.) toluene flush was used to remove heavies and "gunk" from the bed. The bed was then dried with inert gas at 500° F. using 20 pound molecular weights of gas per 100 pounds of zeolite sieve. This regeneration method was used for four cycles, nitrogen serving as the purge gas in the first three cycles and methane serving in the fourth cycle.

In each adsorption step but one, which was run only to age the bed, as the treatment progresses, 7–10 samples of the treated toluene were collected. Each of these samples was tested to determine the concentration of triisobutylaluminum (TIBA) required to initiate polymerization of 1,3-butadiene. Table I shows data on each cycle which indicate the effectiveness of the regeneration procedure of this invention. These data show that the mol sieves reduced the TIBA requirements from 4.4 to 4.6 mhm. (millimoles per hundred grams monomer) in the feed solvent to 2.4 to 2.6 in the treated solvent. This latter value compares very favorably with the 2.2 to 2.4 mhm. required for initiation in the best control solvent available. Breakthrough occurred quite soon, but even after 20–25 gallons of toluene had passed through the 143.7 gram bed, it was still removing more than 50 percent of the total poisons present. Probably the early breakthrough noted above is only for some slightly adsorbed poison or poisons, for the TIBA concentration required for initiation levels off again at approximately 3.0 to 3.2 mhm.

TABLE I

| Cycle No. | Total Effluent, gal. | TIBA Concentration, mhm. | | |
|---|---|---|---|---|
| | | Min. | Avg. | Max. |
| 1 | 25.25 | 2.6 | 2.8 | 3.2 |
| 2 | 21.75 | 2.4 | 2.8 | 3.2 |
| 3 | 22.75 | 2.6 | 2.8 | 3.0 |
| 4 | 19.75 | 2.4 | 2.8 | 3.2 |

*Example II*

To check the effectiveness of flushing the adsorbent bed with warm fresh solvent in removing water-insoluble, non-volatile heavies from the bed of Example I, heavies concentration was measured in cuts of the toluene leaving the bed during the regeneration of cycles 4 and 5 in Example I. It is apparent from the data of Table II that the warm solvent flush successfully carries a substantial concentration of undesirable deposits from the adsorbent bed.

TABLE II.—HEAVIES REMOVED BY HOT TOLUENE FLUSH

| Cycle 4 Flush Temperature 150° F.[1] | | Cycle 5 Flush Temperature 200° F.[2] | |
|---|---|---|---|
| Cut No.[3] | Heavies Content of Flush Toluene, wt. percent | Cut. No.[3] | Heavies Content of Flush Toluene, wt. percent |
| 1 | 0.061 | 1 | 0.008 |
| 2 | 0.021 | 2 | 0.017 |
| 3 | 0.012 | 3 | 0.019 |
| 4 | 0.007 | 4 | 0.009 |
| 5 | 0.004 | 5 | 0.006 |
| 6 | 0.003 | 6 | 0.007 |
| 7 | 0.001 | 7 | 0.003 |
| 8 | 0.002 | 8 | 0.003 |
| Feed[4] | 0.0001 | 9 | 0.002 |
| | | Feed[4] | 0.0005 |

[1] Temperature was 150° F. at start of flush in the bed.
[2] Temperature was 80° F. at start of flush in the bed.
[3] Cut size was 200 ml.
[4] Merck reagent toluene was used.

Even with the improved results in reactivating molecular sieves by the procedure of this invention, the molecular sieves continue to show a gradual decreasing adsorptive capacity after numerous repetitions of the regeneration cycle. This loss in activity is presently believed to be due to carbonaceous laydown during the purification regeneration cycle and the beds' activity may be restored through use of a "burn-off" procedure. "Burn-off" consists of the procedure of raising the temperature of the freshly regenerated bed to about 850° F. while continuing the flow of nitrogen purge gas used in the regeneration. When 850° F. is reached, the nitrogen stream is diluted with air which initiates combustion of deposits in the bed. The amount and percentage of air in the flow can be regulated to keep all temperatures in the bed below a maximum of approximately 1290° F. (see U.S. Patents 3,069,362 and 3,069,363). This "burn-off" has been used to reactivate molecular sieve beds which were treated by the process of this invention numerous times and the "burn-off" operation was able to restore the bed's activity to very closely approximate its virgin capacity. However, frequent use of the "burn-off" procedure is undesirable. If not closely controlled, temperatures in the bed can flare to extreme values and be very detrimental to the absorbent micro-structure. This destruction to some extent is essentially unavoidable in every burn-off. The burn-off procedure is more time consuming, thus requiring more downtime for each adsorbent bed, than the regular water-solvent-gas treatment disclosed in this invention. Therefore, it is apparent that a regeneration procedure which requires fewer and less frequent burn-offs, thereby achieving a more successful burn-off after a given bed life span, contributes significantly to the utility of zeolitic materials.

The advantages of this invention obviously stem from the lengthened adsorptive life of the molecular sieve adsorbant to which the regeneration procedure is applied. Incorporation of the invention into a suitably designed system for treatment of impure toluene from a butadiene polymerization process will result in substantial savings in catalyst requirements.

Other advantages not specifically mentioned but within the scope of this invention will become apparent to those skilled in the art from reading the specification and the subsequent practice of the process.

What is claimed is:
1. A method of regenerating zeolite adsorbents that have been used to purify toluene solvent from a butadiene polymerization process which comprises introducing sufficient water into the adsorbent micro-structure to desorb previous adsorbate while maintaining the adsorbent at a temperature not exceeding 150° F., flushing the adsorbent with fresh toluene at 180–220° F., then drying the bed with a flow of purge gas at 400–650° F.

2. A method of regenerating Zeolite 13× adsorbent that has been used to remove impurities from toluene solvent to be recycled to a butadiene polymerization process which comprises introducing water in the form of vapor into the adsorbent micro-structure by means of an inert carrier gas, such carrier gas flowing through said adsorbent in sufficient quantity to remove heat and maintain the adsorbent temperature below 150° F., then flushing said adsorbent with fresh toluene at 180–220° F., and then purging and drying said adsorbent with a flow of inert gas at 450–500° F.

3. A method of regenerating Zeolite 13× adsorbent that has been used to remove impurities from toluene solvent to be recycled to a butadiene polymerization process which comprises introducing water into the adsorbent micro-structure while removing heat of adsorption of the water by means of an indirect heat exchange apparatus which maintain the temperature of said adsorbent below 150° F., then flushing said adsorbent with fresh toluene at 180–220° F., and then purging and drying said adsorbent with a flow of inert gas at 450–500° F.

4. A method of regenerating Zeolite 13× adsorbent that has been used to remove impurities from toluene to be recycled to a butadiene polymerization process which comprises: draining the feed toluene from the adsorbent bed, introducing water in the form of vapor into the adsorbent micro-structure, such carrier gas flowing through said adsorbent in sufficient quantity to remove heat and maintain the adsorbent temperature below 150° F., then flushing said adsorbent bed with fresh toluene at 200° F., purging and drying said adsorbent with a flow of inert gas at 500° F., after said purging is complete continuing said flow of inert gas while raising the temperature of said adsorbent bed to 840–860° F., then diluting said inert gas flow with air to initiate combustion of deposits in said adsorbent bed, and regulating the amount of air flow so that temperature at any point in said adsorbent bed does not exceed 1290° F. until the combustion is completed, at which time bed temperature is lowered to ambiency.

References Cited

UNITED STATES PATENTS 3,053,774  9/1962  Walther _____ 252—414
3,069,363  12/1962  Mays et al. _____ 252—419

FOREIGN PATENTS 658,137  2/1963  Canada.

OSCAR R. VERTIZ, *Primary Examiner.*

A. GREIF, *Assistant Examiner.*